US006922715B2

(12) United States Patent
Kobayashi et al.

(10) Patent No.: US 6,922,715 B2
(45) Date of Patent: *Jul. 26, 2005

(54) COMPUTER IMPLEMENTED METHOD AND PROGRAM FOR ESTIMATION OF CHARACTERISTIC VALUES OF MATRIXES USING STATISTICAL SAMPLING

(75) Inventors: Mei Kobayashi, Aoba-ku (JP); Georges Eric Dupret, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 666 days.

This patent is subject to a terminal disclaimer.

(21) Appl. No.: 09/791,198

(22) Filed: Feb. 23, 2001

(65) Prior Publication Data

US 2002/0013801 A1 Jan. 31, 2002

(30) Foreign Application Priority Data

May 8, 2000 (JP) .................................... 2000-134416

(51) Int. Cl.⁷ .............................................. G06F 15/00
(52) U.S. Cl. ..................................... 708/520; 708/200
(58) Field of Search ............................. 708/200, 520, 708/607

(56) References Cited

U.S. PATENT DOCUMENTS

| | | | | |
|---|---|---|---|---|
| 4,807,148 A | * | 2/1989 | Lacey | 702/32 |
| 5,615,288 A | * | 3/1997 | Koshi et al. | 382/248 |
| 6,370,490 B1 | * | 4/2002 | Reefman et al. | 702/196 |
| 6,636,804 B1 | * | 10/2003 | Joshi | 701/208 |

* cited by examiner

Primary Examiner—Chuong Dinh Ngo
(74) Attorney, Agent, or Firm—Whitham, Curtis & Christofferson, P.C.; Stephen C. Kaufman

(57) ABSTRACT

The present invention discloses a computer system and program product. A computer system including an algorithm for computing a characteristic value of a matrix comprising steps of; providing a first matrix comprising M rows and N columns (M-by-N matrix); providing second matrixes by randomly selecting rows from the first matrix, each of the second matrixes including predetermined numbers of rows smaller than the numbers of rows of the first matrix; computing the characteristic values for the second matrixes; plotting each of the characteristic values with respect to the predetermined numbers of rows; and extrapolating the plots to said number of rows of the first matrix so as to obtain a characteristic value of the first matrix.

9 Claims, 18 Drawing Sheets

Fig. 14   random matrix (matr3) (50x50 elements)

COMPUTER IMPLEMENTED METHOD AND PROGRAM FOR ESTIMATION OF CHARACTERISTIC VALUES OF MATRIXES USING STATISTICAL SAMPLING

DETAILED EXPLANATION OF INVENTION

1. Field of Invention

The present invention relates to a computer system and a program product for computing singular values of very large matrixes and eigenvalues, and more particularly relates to an algorithm for calculating singular values of very large matrixes and eigenvalues using statistical sampling.

2. Background of Art

Computation of singular values and eigenvalues of very large matrixes has been made in wide technical fields, such as mathematics, physics, engineering, information science. However, computation of the eigenvalues and singular values of very large matrixes has been left as a long standing problem due to their many computation steps, and performances of computer systems including central processing units (CPUs) and available memories therein, etc.

Recently, availability of inexpensive computing systems and memory resources is improved and users of the computer systems become able to compute singular values and eigenvalues for increasingly larger matrixes, however, there is still an upper limit on the size of matrixes which can be handled in the computer systems.

The computation of singular values and eigenvalues often appears in various stages of technical fields, such as, for example, in determination of closest distance to any matrix with rank N, in determination of a lower bound for the condition number, in finding of eigenvalues, in determination of clustering patterns of singular values accurately, in estimation for computation and paging required to determine singular triplets, and in information retrieval. Particularly, the largest singular value, named as 2-norm of a matrix (see, e.g., Watkins 1991, "Fundamentals of Matrix Computations", John Wiley and Sons, NY, 1991), is important for many purposes. The 2-norm of a matrix is generally defined as follows;

$$\|A\|_2 = \max_{x \neq 0} \frac{\|Ax\|_2}{\|x\|_2} \quad (1)$$

wherein A is a matrix and x is a non-zero vector having a non-zero norm. The 2-norm of the matrix represents the maximum magnification that can be undergone by any vector with appropriate length when making a product between the matrix A and the vector x. The 2-norm of the matrix is useful in various fields of interest as described above.

For example, in determination of the closest distance to any matrix with rank N, C. Eckhart and G. Young, "A Principal Axis Transformation for Non-Hermitian Matrixes", Bulletin of the American Mathematical Society, Vol. 45, February 1939, pp. 118–121 (Watkins, D., statement of theorem given in standard textbooks, e. g., "Fundamentals of Matrix Computations", John Wiley and Sons, NY, 1991) disclose a computation method for any matrix of equivalent dimensions with rank N for obtaining the closest distance thereof.

Parlett, B., in "The Symmetric Eigenvalue Problem, SIAM, Philadelphia, Pa., 1998", discloses a computation method by orthogonalizing only with respect to singular vectors whose corresponding singular values are in the same cluster. In application to information retrieval, U.S. Pat. No. 4,839,853 issued to Deerwester et. al. on Jun. 13, 1989 entitled "Computer information retrieval using latent semantic structure" discloses application for an information retrieval system which uses a vector space model of document, keyword, and query space for ranking, that is, Latent Semantic Indexing. The Latent Semantic Indexing is also disclosed in Deerwester, S. et al., "Indexing by latent semantic analysis", Journal of the American Society for Information Science, Vol. 41, 6, 1990, pp. 391–407. The spread of the singular values, i.e., the relative changes in the singular values when moving from the largest to the smallest, is used therein to determine dimension of a reduced subspace which may be used to model document-keyword space.

Knowledge of the clustering patterns of the singular values will allow accurate estimation of computations which need to compute singular triplets, i.e., singular values and their associated pairs of singular vectors of a matrix.

Therefore, economical and effective methods and/or algorithms for computing the singular values and eigenvalues of very large matrixes have been long waited in various technical fields in which the computation of the singular values and the eigenvalues play important roles.

SUMMARY OF INVENTION

An object of the present invention is to provide an economical and effective computer system for computing the singular values and eigenvalues of very large matrixes.

An another object of the present invention is to provide a program for an economical and effective methods for computing the singular values and eigenvalues of very large matrixes.

The present invention essentially based on the recognition that reduction of the size of the matrix makes the computation of the singular values and the eigenvalues of the matrixes significantly easy. Therefore, the inventors have sought a novel algorithm for computing accurately the singular values and eigenvalues of very large matrix by constructing smaller matrixes from rows of the very large matrix.

The present invention may be effective in the following purposes;

Determination of the Closest Distance to any Matrix with Rank N

The present invention may be useful to estimate the i-th singular values of a matrix including the largest singular value. The present invention may also be effective to provide the closest distance to any matrix of equivalent dimensions with rank N by a well-known theorem reported by Eckhart and Young (see, e.g., Eckhart and Young 1939 and Watkins 1991).

Determination of a Lower Bound for the Condition Number

The condition number of a matrix A is one of the simplest and useful measure of sensitivity of a linear system associated with the matrix, i.e., Ax=b, wherein x and b represent arbitrary vectors. Although, the condition number is defined as the product between the 2-norm of A and the 2-norm of the inverse of A for very large matrixes, the computation of the inverse of A and its 2-norm may usually be too difficult. It was proved that the condition number is the largest non-zero singular value divided by the smallest non-zero singular value.

The present invention is not always effective to compute the smallest non-zero singular value, however, when we may compute the N-th singular value, a quotient $$Q=(\Sigma_1/\Sigma_N) \quad (2)$$

will give a lower bound for the condition number of the matrix, i.e., the condition number of A is greater than or equal to Q, wherein $\Sigma_1$ represents the largest singular value and $\Sigma_N$ represents the N-th sinlular value. When the lower bound Q is large, it is useful to know that the computations would be very sensitive to errors. For example, usually it is unknown whether or not small numbers in a matrix are set to zero in order to simplify the matrix having with a very large condition number, since results from computations using such modified matrix set small numbers to zero without any care may have nothing to do with the solution to the original problem.

Since a sharper estimate for the condition number of a huge matrix is not provided easily because of its size, the largest eigenvalue may be computed using the power method. The present invention is useful to check the largest eigenvalue easily and accurately. In order to find an upper bound of the smallest possible singular value which is represented herein by $\Sigma_{low}$ may also be computed according to the present invention. Therefore, it is safely assumed that overestimated values of $\Sigma_{low}$ by using linear extrapolation using a tangent line.

Eigenvalue Finding

There are many scientific and engineering problems which require the determination of the singular values of very large, rectangular matrices and eigenvalues and eigenvectors of very large, symmetric, positive, semi-definite matrixes. The present invention may also provide a useful method for accurate estimation of above characteristic values available to the above field.

Accurate Determination of Clustering Patterns of Singular Values and Accurate Estimation of Computation and Paging Required to Determine Singular Triplets Even very crude implementation of the algorithm with very few points according to the present invention, clustering patterns of the singular values of a matrix may be accurately estimated. The inventors have found that singular values of matrixes tend to be unevenly distributed, and hence the singular matrixes usually cluster about several values. The algorithm according to the present invention yields very accurate information on the clustering patterns thereof.

This information may be useful, because a good approximation of singular vectors may be provided by orthogonalizing only with respect to the singular vectors of which singular values are categorized in the same cluster (see, Parlett. B., "The Symmetric Eigenvalue Problem", SIAA, Philadelphia, Pa. 1998). When then the clustering patterns of the singular values are known once, accurate estimation of computations required for computing the singular triplets, i.e., singular values and their associated pairs of singular vectors of a matrix may be possible. A user of the computer system according to the present invention may easily decide how many singular triplets including presence thereof, and the user may execute the his/her computation based on the extent of paging which may be tolerated.

Application to Information Retrieval

The present invention will be effective in an information retrieval system which uses a vector space model of documents, keywords, and query space for ranking, for example, Latent Semantic Indexing (see, Deerwester et. al. 1989 and also Deerwester et. al. 1990). The spread of the singular values, i.e., the relative changes in the singular values when moving from the largest singular values to the smallest singular values can be used to determine the dimension of a reduced subspace which may be used to model document-keyword space. Once the appropriate dimension is known, the extent of paging and associated overhead in time, which may occur when Lanczos Method may be used to compute the corresponding singular vectors, is estimated.

Therefore, according to the present invention, a computer system including an algorithm for computing a characteristic value of a matrix may be provided.

The computer system comprises the algorithm comprising steps of;

providing a first matrix comprising M rows and N columns (M-by-N matrix);

providing second matrixes by randomly selecting rows from the first matrix, each of the second matrixes including predetermined numbers of rows smaller than the numbers of rows of the first matrix;

computing the characteristic values for the second matrixes;

plotting each of the characteristic values with respect to the predetermined numbers of rows; and extrapolating the plots to said number of rows of the first matrix so as to obtain a characteristic value of the first matrix.

According to the first aspect of the present invention, the characteristic value may be a singular value of the matrixes.

According to the first aspect of the present invention, the characteristic value may be an eigenvalue of the matrixes.

According to the first aspect of the present invention, the step of computing the said characteristic value may comprise a step of computing i-th characteristic values, and the step of plotting may comprise a step of plotting i-th characteristic values with respect to the predetermined numbers of rows so as to obtain i-th characteristic values of the first matrix.

According to the first aspect of the present invention, the step of extrapolating the plots may be carried out by curve fitting and an extrapolation using a neural net method.

According to the first aspect of the present invention, the characteristic value may be a singular value of the matrixes.

According to the first aspect of the present invention, the characteristic value may be an eigenvalue of the matrixes.

According to the first aspect of the present invention, the second matrixes may be formed as a series of matrixes comprising a predetermined relation of said numbers of rows.

According to the first aspect of the present invention, the characteristic values of each second matrix may be computed and averaged for each of the series prior to the step of extrapolation.

According to the second aspect of the present invention, a program product includes a computer readable computer program. The computer program executing a method for calculating a characteristic value of a matrix comprising steps of;

providing a first matrix comprising M rows and N columns (M-by-N matrix);

providing second matrixes by randomly selecting rows from the first matrix, each of the second matrixes including predetermined numbers of rows smaller than the numbers of rows of the first matrix;

computing said characteristic values for each of the second matrixes;

plotting each of the characteristic values with respect to the predetermined numbers of rows; and extrapolating the plots to said number of rows of the first matrix so as to obtain a characteristic value of the first matrix.

According to the second aspect of the present invention, the characteristic value may be a singular value of the matrixes.

According to the second aspect of the present invention, the characteristic value may be an eigenvalue of the matrixes.

According to the second aspect of the present invention, the step of computing the characteristic values may comprise a step of computing i-th characteristic values, and the step of plotting may comprise a step of plotting i-th characteristic values with respect to the predetermined numbers of rows so as to obtain i-th characteristic values of the first matrix.

According to the second aspect of the present invention, the step of extrapolating the plots may be carried out by curve fitting and an extrapolation by a neural net method.

According to the second aspect of the present invention, the characteristic value may be a singular value.

According to the second aspect of the present invention, the characteristic value may be an eigenvalue.

According to the second aspect of the present invention, the second matrixes may be formed as a series of matrixes comprising a predetermined relation of said numbers of rows According to the second aspect of the present invention, the characteristic values of each second matrix may be computed and averaged for each of the series prior to the step of extrapolation.

BEST MODE FOR CARRYING OUT INVENTION

The present invention essentially determines the largest top 10%–25% singular values of very large matrixes and/or very large symmetric, positive definite matrices when the matrixes are so large that use of standard algorithms will strain computational resources and result in consuming a lot of computation time, or will lead to paging.

Hereunder, the present invention will be explained using M-by-N document-attribute matrix which is represented by A. Most important goal of the present invention is to estimate the largest p (p<0.01*M) singular values of A when conventional SVD (Singular Value Determination) algorithms cannot be effective because A is too large.

Algorithms for Estimating Singular Values

Figure 1:
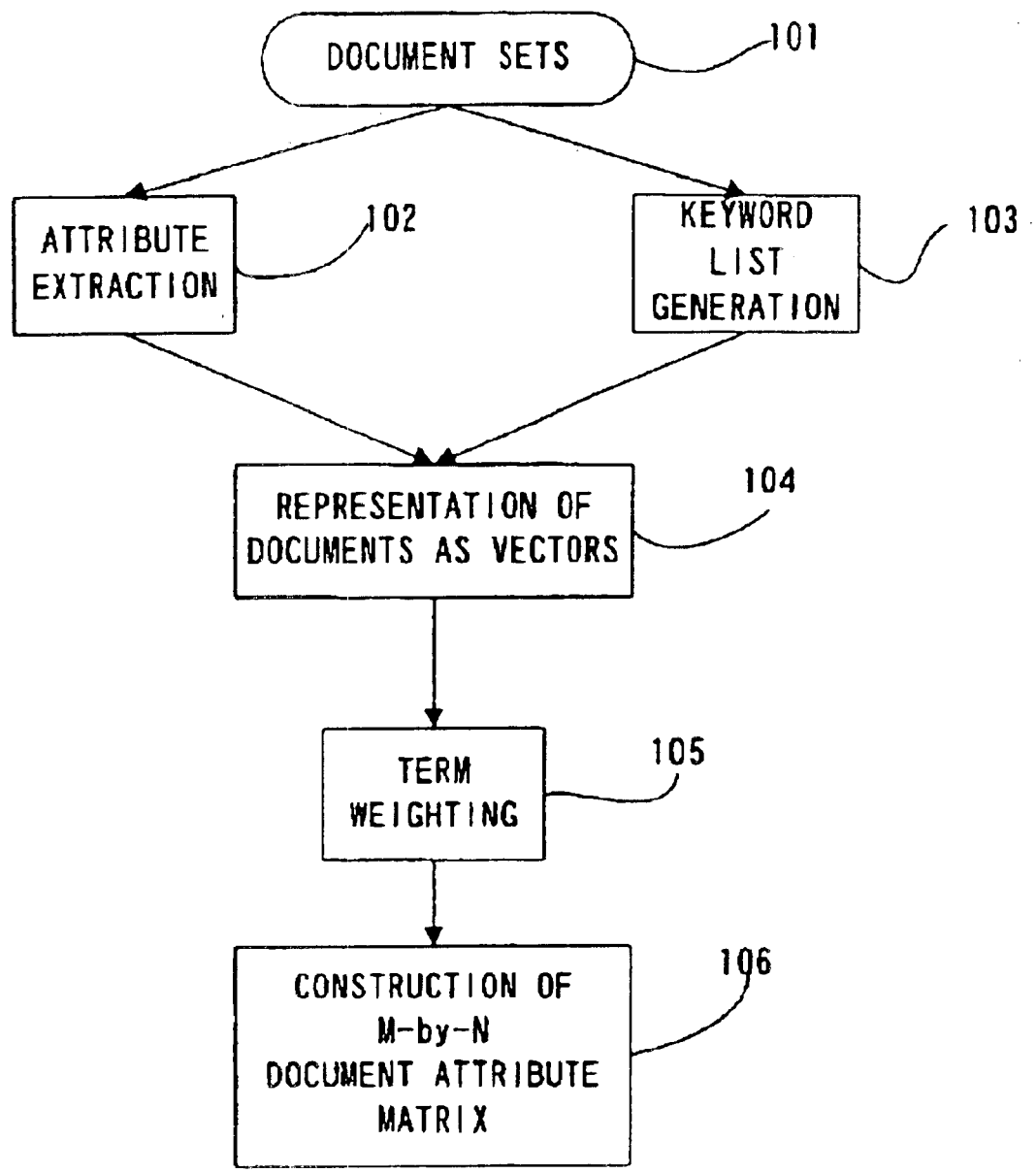
FIG. 1 shows a schematic flowchart to obtain M-by-N document-keyword matrix used to the present invention

For clarity and easiness of the explanation, the present invention will be explained by a particular embodiment in which the algorithm according to the present invention is applied to a search engine in a large database. Referring to FIG. 1, a schematic flowchart to obtain M-by-N document-keyword matrix used to the present invention is depicted. As shown in FIG. 1, the database including document sets is provided in the step 101. Usually, document sets in the database comprise a plurality of documents. The documents are comprised of various attributes, such as keywords, name, date/time etc., but not limited thereto, any other attributes may be selected in the present invention. The process proceeds to the steps 102 or 103 and executes attribute extraction or keyword list generation using well-known method in the art. Examples of attributes are a date of creation and a frequency of access, etc., but not limited thereto, any other attributes may be used in the present invention.

Next, the process proceeds to the step 104, and vector representations of the documents are generated in order to generate the document-attribute matrix for the search purposes. Here, each dimension of the vectors is equal to a number of attributes selected in the steps 102, 103. The algorithm shown in FIG. 1 next executes binary conversion of the attributes. Then weighting factors of the attributes may be computed and each attribute may be weighted by the weighting factors in the step 105 when the weighting factors are required.

Examples of the weighting factors are such as, for example, a term frequency and a term ratio used in title/abstract, but not limited thereto, any weighting factor may be used in the present invention. Alternatively, the weighting factors may not be used when not necessary.

In the step 106, the M-by-N document-attribute matrix is formed by thus obtained vectors. Here, M corresponds to numbers of documents included in the vectors, and N corresponds to numbers of attributes selected in the steps 102, 103 in the database. Thus obtained M-by-N matrix includes usually very large elements which correspond to the attributes selected and the numbers of the documents included in the database. In addition, the numbers of attributes may mostly be less than the numbers of documents in the database, because the documents included in the database may be larger than the attributes to be selected with sufficient confidence, and therefore, the M-by-N matrix becomes rectangular in which M is larger than N. This is mainly because the documents may possible be up to several ten-thousands and increase with respect to time elapse from the creation thereof. Therefore, a convenient method for computing singular values and eigenvalues thereof may not be effective when considering memory resources, a CPU performance, and computing time, etc.

Figure 2:
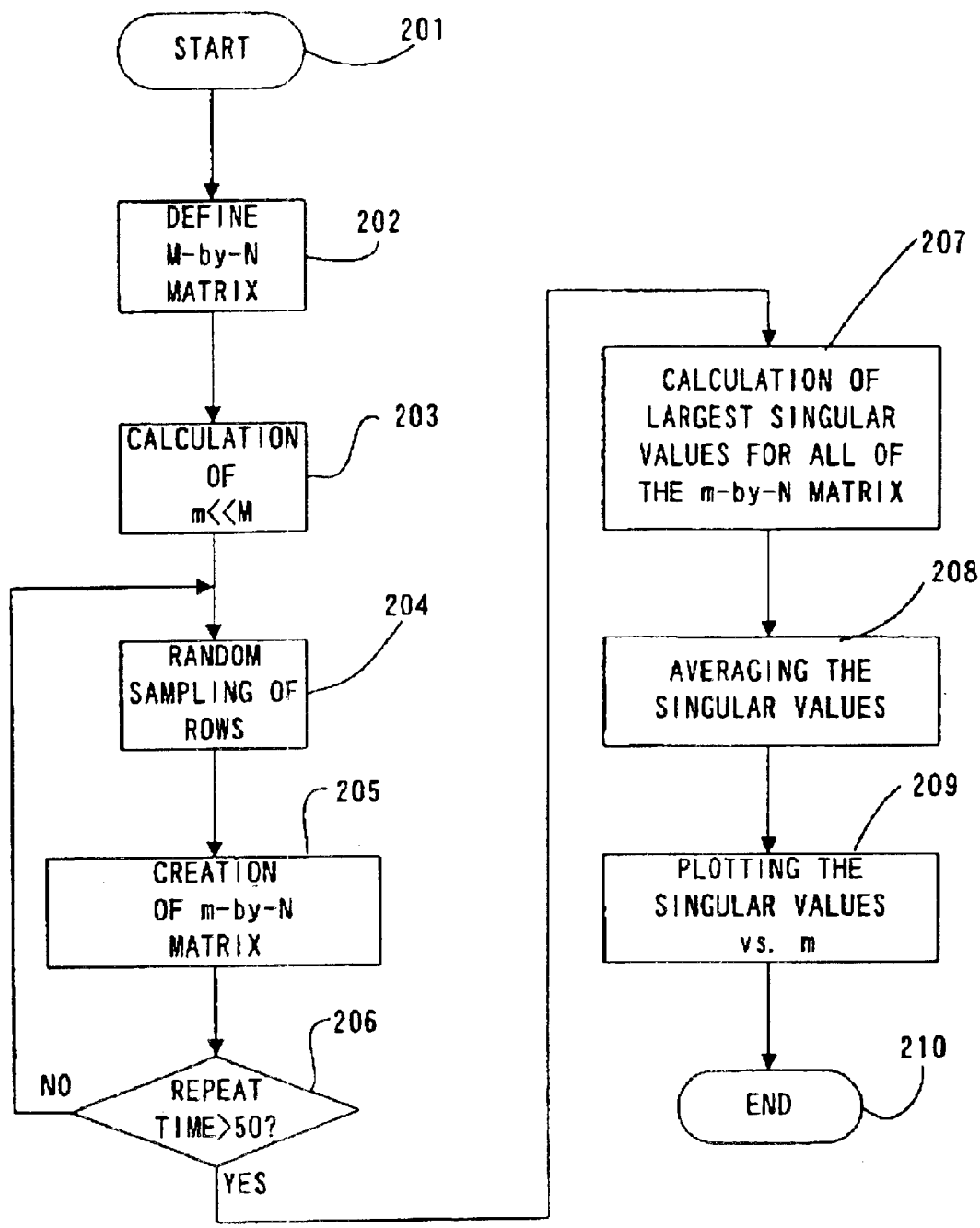
FIG. 2 shows a schematic flowchart of the process according to the present invention.

FIG. 2 shows a schematic flowchart of the process according to the present invention. The algorithm according to the present invention starts from the step 201, and defines the M-by-N matrix A obtained in the step 104 as described. Next, numbers of vectors extracted from the matrix A is calculated in the step 203 for generating smaller matrixes having m rows where "m" is much smaller than M (m<<M). In the illustrated embodiments, the number of rows, i.e., m is defined by the following equation;

$$m = 0.01 \times j \times M \qquad (3)$$

wherein m is the number of rows included in the smaller matrix, j is a natural number which may be selected in a predetermined relation, and M is the number of rows in the document-attribute matrix, i.e., the documents in the database. Here, j is selected, for example, from natural numbers such as 4, 8, 12, 16, . . . , and more larger numbers may be used depending on a size of the matrix and availability of memory resources, but not limited thereto, any other predetermined spacing of j may be used in the present invention and the constants other than 0.01 may be selected. Other suitable relations to obtain the smaller matrix may be used depending on a purpose of the search and other specific applications.

In the first embodiment according to the present invention, the process proceeds to the step 204 and execute random sampling of the rows from the matrix A for each j using a random number generator routine. The sampling may the executed without any limitation, however, the sampling may be executed such that the same row is not sampled twice, however, any other sampling procedure may be adopted as far as the random sampling is carried out sufficiently. As shown in FIG. 2, the algorithm according to the present invention then proceeds to the step 205 and executes creation of a smaller m-by-N matrix A' from randomly selected rows of the matrix A. The processes 204, 205 may be repeated, for example, for 50 times to generate different smaller matrixes having the same m value in the step 206. Any repeat number may be used in the present invention. After the procedure of the step 206, different m-by-N matrixes are constructed by randomly selected rows.

In the step 207 shown in FIG. 2, the singular values of matrix A' such as the largest singular values are calculated using conventional well-known techniques such as, for example, Lanczos Method followed by Strum sequencing (see, Parlett 1998, and Jennings, A., et. al., J. Matrix Computation, 2nd edition, John Wiley and Sons, NY, 1979). In the step 207, the same procedure is applied to all of the smaller matrixes having the same m. Then the procedure proceeds to the step 208 and the computed singular values for each m are averaged to reduce errors. The same procedure may be repeated to obtain i-th singular values including the largest singular values, sigma (i, j), wherein j is described above, and "i" is an order of the singular values. Since the small matrix may be generated to have very small size when compared to M, therefore, computation of the singular value and eigenvalues may become easy. In addition, it becomes more easy to check whether or not the row has not already been selected. The same advantages may be expected in the following embodiments.

Figure 3:
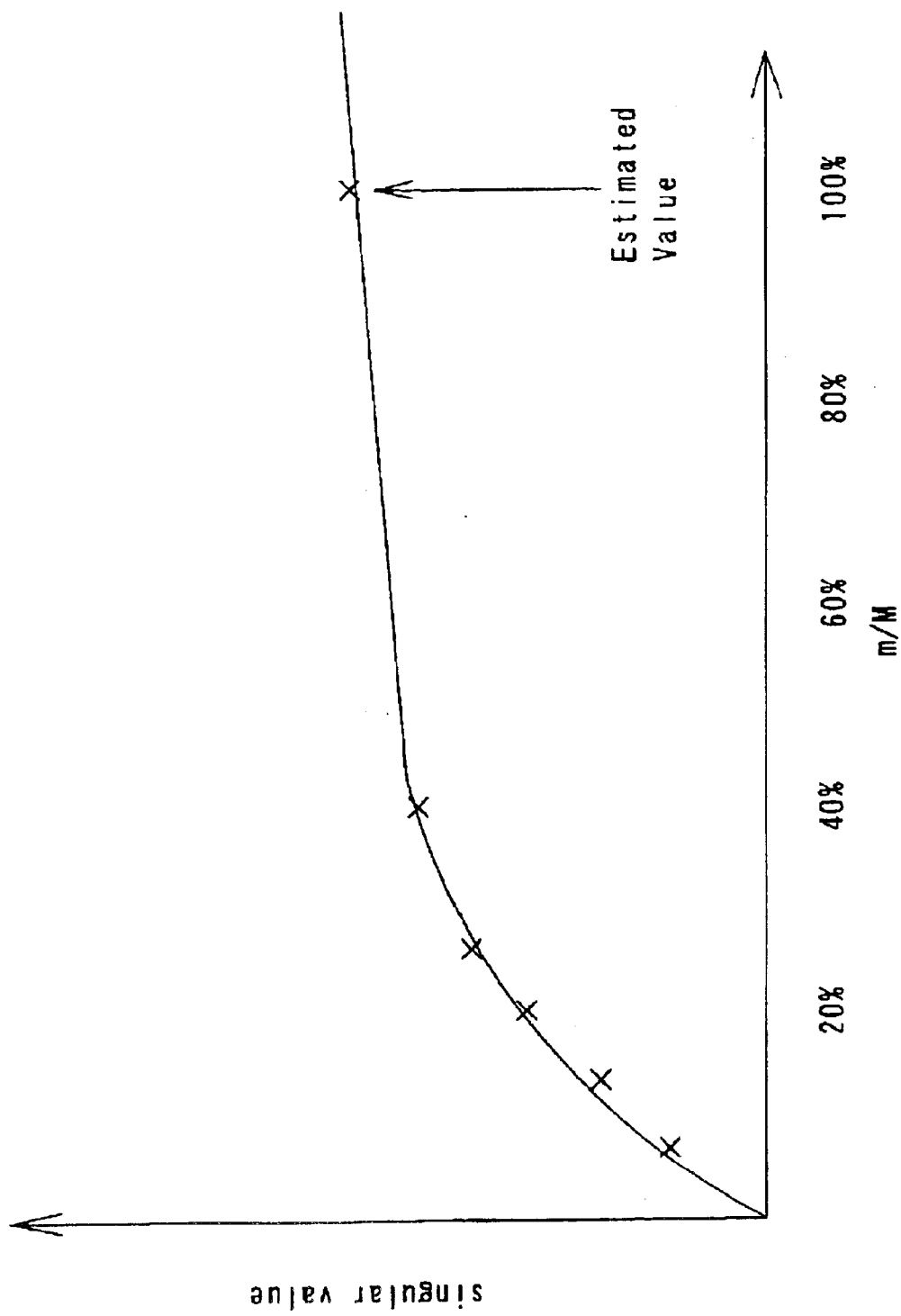
FIG. 3 shows schematic results of plot for i-th singular values according to the present invention.

The procedure depicted in FIG. 2 further proceeds to the step 209 wherein the computed i-th singular values $\Sigma_i$, including the largest singular values are plotted with respect to "m" to obtain curves of sigma (i, j) vs. m. The results of plotting are schematically shown in FIG. 3 for i-th singular values. In FIG. 3, the ordinate represents the singular value and the abscissa represent ratio of m/M represented by percentages. In FIG. 3, the estimated value of the $\Sigma_i$, which corresponds to the Matrix A having M rows and is obtained from curve fitting and extrapolation, is shown by the circle. The curve fitting and the extrapolation may be carried out by any suitable method known in the art such as, for example, (human) hand-drawn curve fittings, polynomial fittings, fittings using spline functions, and a neural net method (see, Masters, T., "Advanced Algorithms for Neural Networks: a C++ Sourcebook", John Wiley and Sons, NY, 1993). However, the extrapolation algorithms using neural nets may be effective to obtain sufficient results without noises caused by conventional polynomial fitting and extrapolations and other fitting methods.

Figure 4:
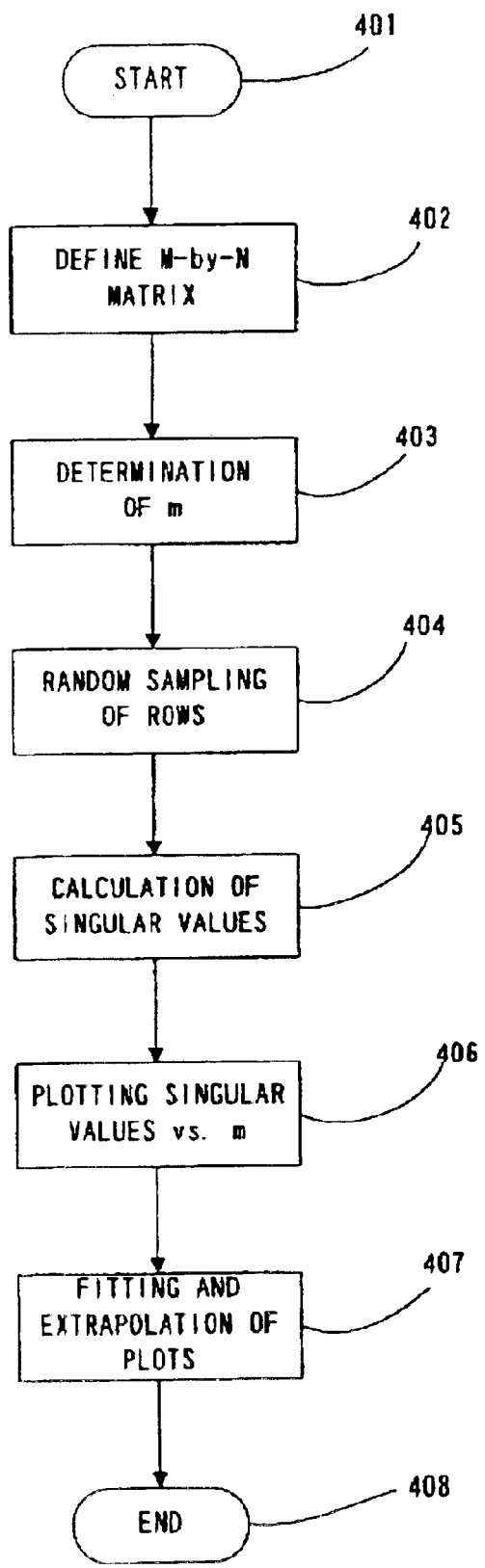
FIG. 4 shows second embodiment of the algorithms according to the present invention.

FIG. 4 shows second embodiment of the algorithms according to the present invention. In the second embodiment according to the present invention, the averaging step of the singular values is excluded as far as results with sufficient accuracy may be obtained. The procedure of the second embodiment starts from the step 401 and defines M-by-N matrix A as described above in the step 402. In the step 403, "m" is derived from the formula (3), while j is selected from smaller sequential natural numbers such as, for example, 1, 2, . . . , 20 or 20, 21, . . . , 120. Other natural numbers may be used in the present invention according to the size of the Matrix A. In the step 404, random sampling of the rows of matrix A is carried out to form smaller m-by-N matrix A' consisted from the rows randomly selected. The procedure proceeds to the step 405 and the singular values of matrix A' generated for each m as described above are computed.

The procedure depicted in FIG. 4 further proceeds to the step 406, wherein the computed i-th singular values, sigma (i, j) are plotted with respect to "m" to obtain curves of sigma (i, j) vs. m as described in FIG. 3. In the second embodiment of the present invention, the curve fitting and the extrapolation may also be carried out in the step 407 using any suitable method known in the art. However, as described above, the extrapolation algorithms using neural nets (see, Masters, T., "Advanced Algorithms for Neural Networks: a C++ Sourcebook", John Wiley and Sons, NY, 1993) may also be effective to obtain sufficient results without noises.

Figure 5:
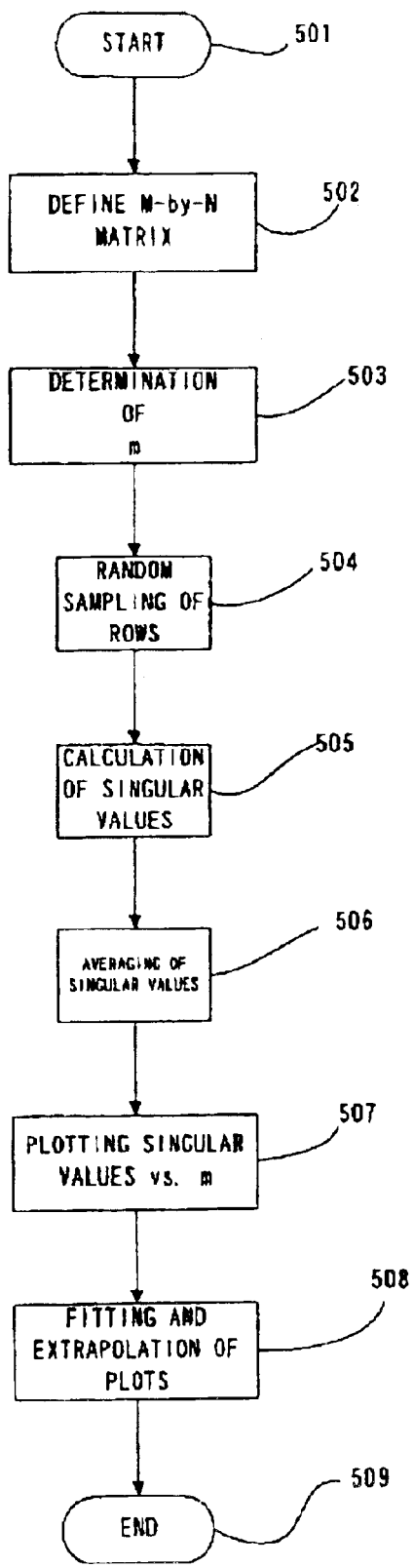
FIG. 5 shows a third embodiment according to the present invention which is a hybrid method of the first embodiment and the second embodiment.

FIG. 5 shows a third embodiment according to the present invention which is a hybrid method of the first embodiment and the second embodiment. The procedure starts from the step 501 and proceeds to the step 502 to define M-by-N matrix A. The procedure next proceeds to the step 503 and "m" is determined according to the formula (3). In the described embodiment, j may be selected from a series of j evenly or unevenly spaced in the step 503. Then the procedure proceeds to the step 504 and executes random sampling of the rows of the matrix A. Further next, the singular values are calculated in the step 505. When the matrixes A having the same j value are appeared, then the singular values of the matrix A are averaged in the step 506. Thereafter, the singular values are plotted in the step 507 to obtain the curves of $\Sigma_i$ vs. m. The singular values are extrapolated in the step 508 so as to obtain the estimated singular values of the matrix A. Here, the neural net extrapolation method may also be effective in the present embodiment.

Hereinabove, the present invention has been explained using computation of the singular values, however, the procedure and/or algorithms according to the present invention are also effective in determination of eigenvalues of symmetric, positive definite matrixes. The procedure and/or algorithm described above may, of course, straightforwardly be used to determine the eigenvalues of a symmetric, positive definite matrix since the singular values are identical with the eigenvalues in such cases. For symmetric, positive definite matrixes, the inventors have found fairly good agreements with eigenvalues determined using standard algorithm such as, for example, Gauss-Seidel or Successive Over-Relaxation (SOR) methods.

Hereinbelow, the present invention will be further explained using exemplary examples thereof. However, these examples are only provided as illustrative purposes and therefore, do not limit the scope of the present invention.

EXAMPLES

The algorithms according to the present invention were examined by applying the algorithms to actual databases. The databases used were;

(1) data from IBM Raleigh's Customer Call Center, and
(2) randomly generated positive semi-definite, square matrixes.

Example 1

Data Set:

The data in the database were converted to a document-keyword matrix of size 36,403-by-10,000 (M-by-N). The rows of the above matrix were sampled using random sampling method by a conventional random numbers generator to form small matrixes A'. Then the largest top 5 singular values of the resulted smaller matrixes were computed. The same procedure was repeated for 100 times and small matrixes having the same j value were constructed. Then the sigma (i, j) of the matrixes were computed. Each of the results were averaged to obtain mean values for the sigma (i, j) and also to obtain standard deviations.

In this example, whether or not the rows sampled once or more affect the results of the estimation according to the first algorithm of the present invention was examined as follows;

(1) Rows were allowed to be selected more than once, or
(2) Rows were not allowed to be selected more than once.

Figure 6:
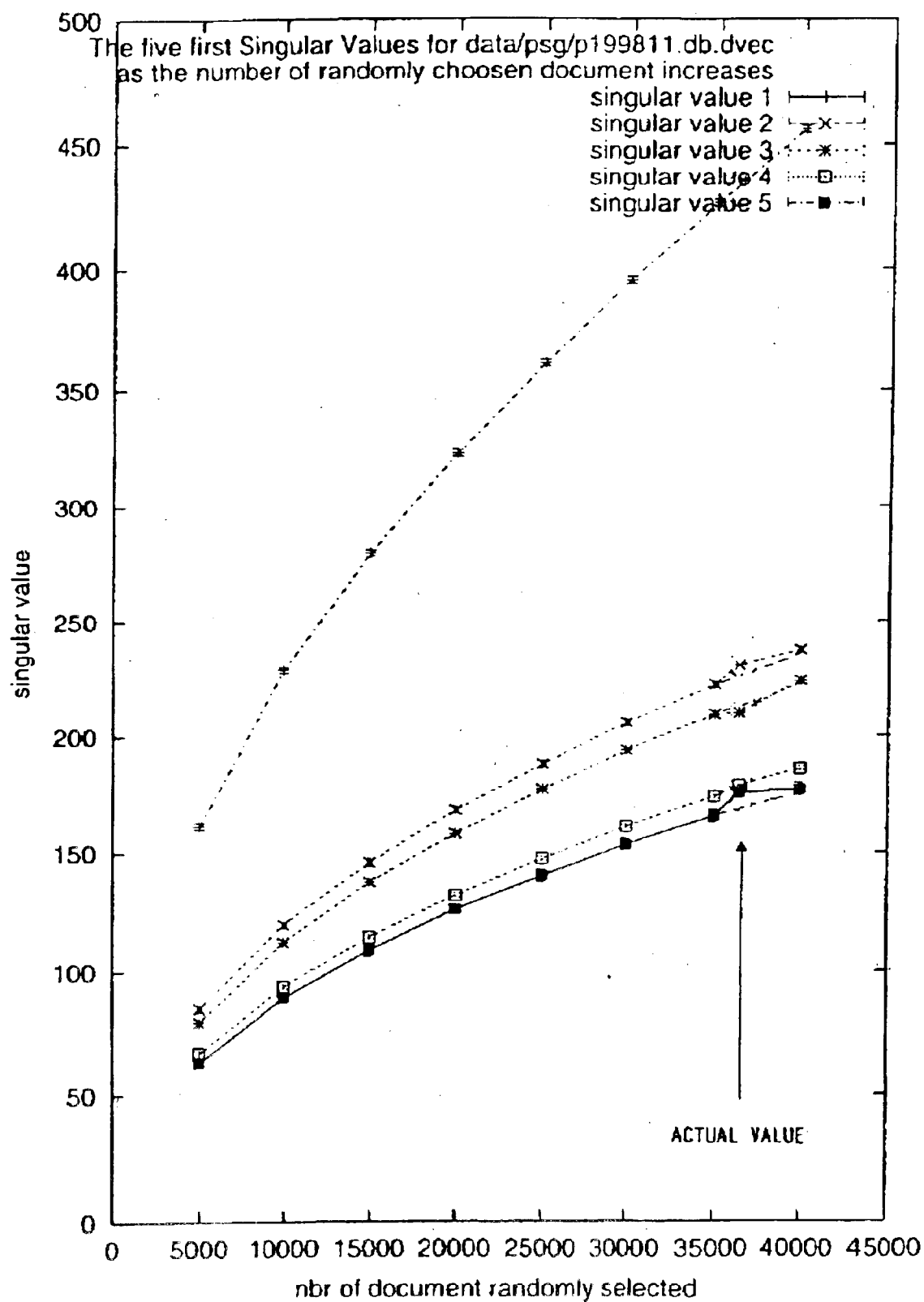
FIG. 6 shows plots of the singular values from the largest to the 5-th largest singular values.

The results using the rows allowed to be selected more than once are shown in FIG. 6. The numeral data thereof are listed in Table I.

FIG. 6 shows plots of the singular values from the largest to the 5-th largest singular values. In FIG. 6, the ordinate represents singular values and the abscissa represent numbers of documents randomly selected. As shown in FIG. 6, the Values of $\Sigma$ (i, j) gradually increase with respect to the number of documents and the smooth curves for each $\Sigma_i$ values are obtained by the neural net method (see, Masters, T., "Advanced Algorithms for Neural Networks: a C++ Sourcebook", John Wiley and Sons, NY, 1993). The computed actual values for these matrixes are shown in by an arrow. In order to examine the presence of the same rows, the inventors used duplicate copies of the rows, and then the rows from 15% up to 110% were sampled to prepare the matrix. The extrapolated curves show small deviation from the actual values at the position indicated by the arrow, however the deviations fall within about 10% at most as shown in FIG. 6. The results show significant matching even though the rows were allowed to be selected twice. Therefore, the algorithm according to the present invention is concluded to be not sensitive to the presence of the rows selected twice or more.

Example 2

Figure 7:
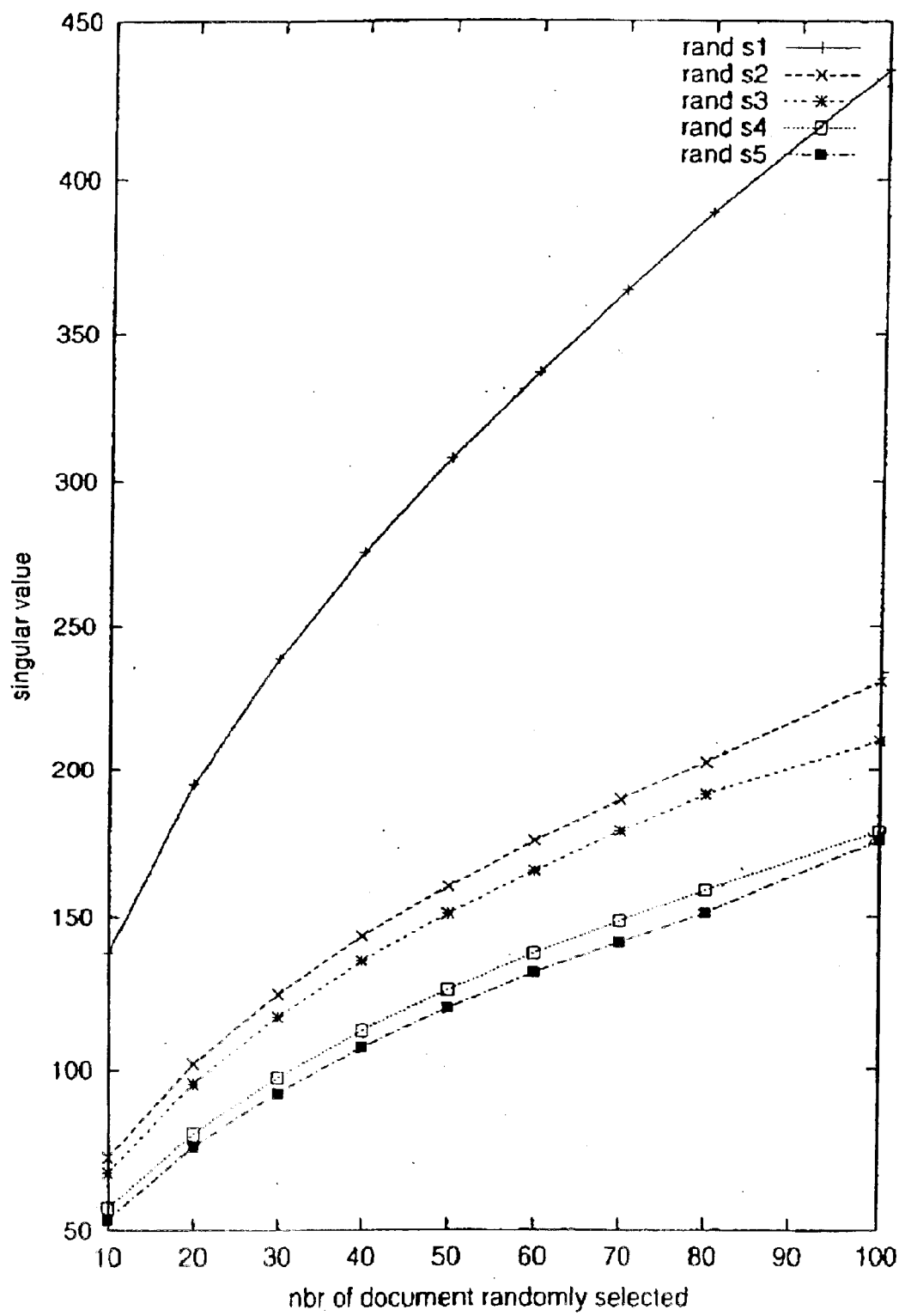
FIG. 7 also shows plots of the singular values from the largest to the 5-th largest singular values.

The largest top 5 singular values using randomly selected rows of M to be 10%, 20%, 30%, 40%, 50%, 60%, 70%, and 80% were further computed in order to make sure by constructing the small matrix in which duplicates of rows did not appear at all in the smaller matrix. The results are shown in FIG. 7. The actual singular values are plotted on the right most line of FIG. 7 where the position corresponds to 100% of the rows (M). The curves almost converge to the actual value as shown in FIG. 7.

Example 3

Random 50-by-50, 100-by-100 and 150-by-150 symmetric, positive, semi-definite matrixes were constructed and the algorithm of the present invention was tested in order to examine the effectiveness of the computation of the singular values, eigenvalues of the symmetric matrixes. The matrixes used were generated by making the product of rectangular matrix, where one dimension was 500, and transpose thereof, where the entries of the matrixes were generated at random using the rand ( ) function provided in standard C libraries well-known in the art.

Figure 8:
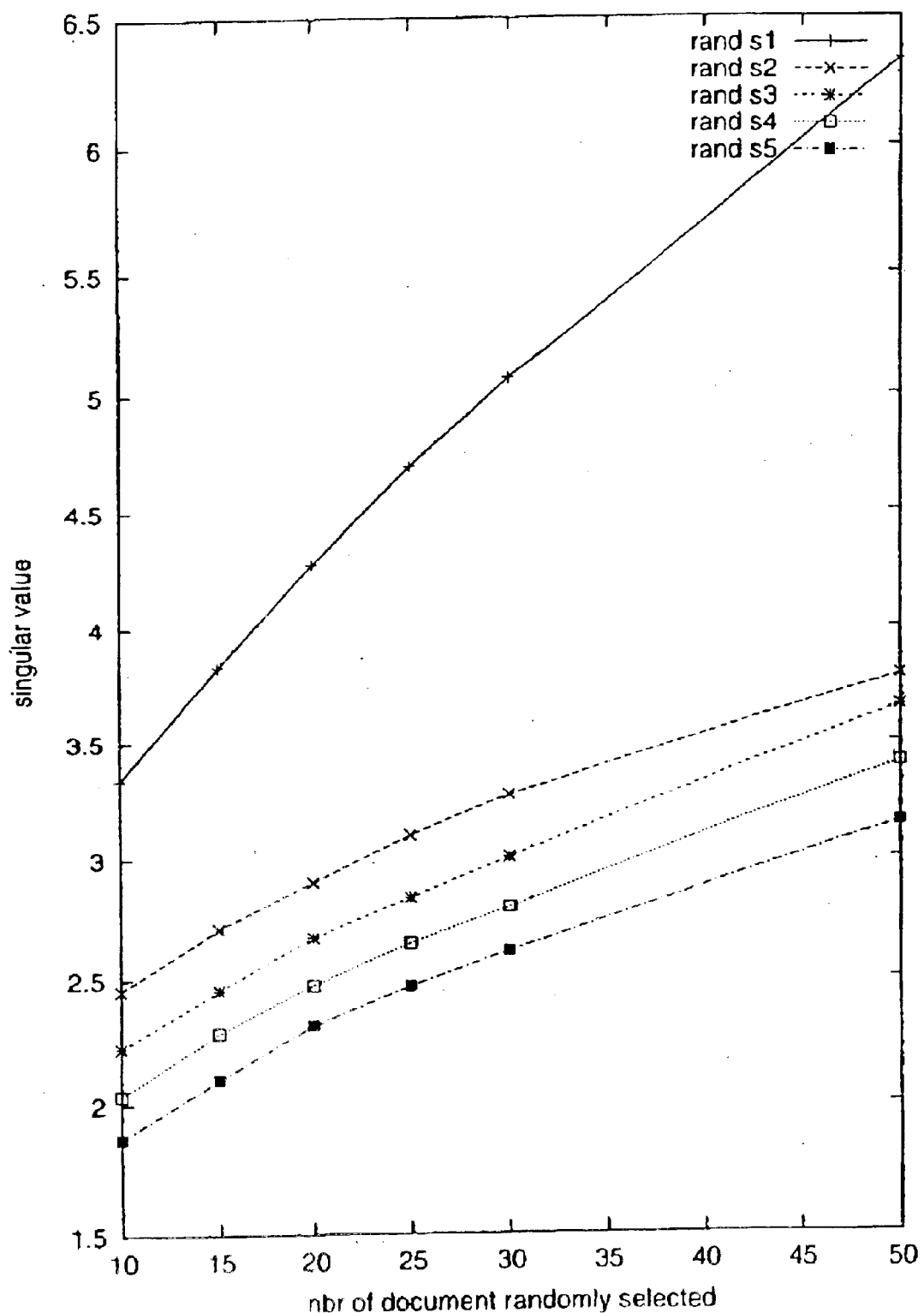
FIG. 8~FIG. 10 shows results of plotting the singular value for the matrixes of 50-by-50, 100-by-100, and 150-by-150 using the modified neural networks for curve fitting and extrapolation.
Figure 9:
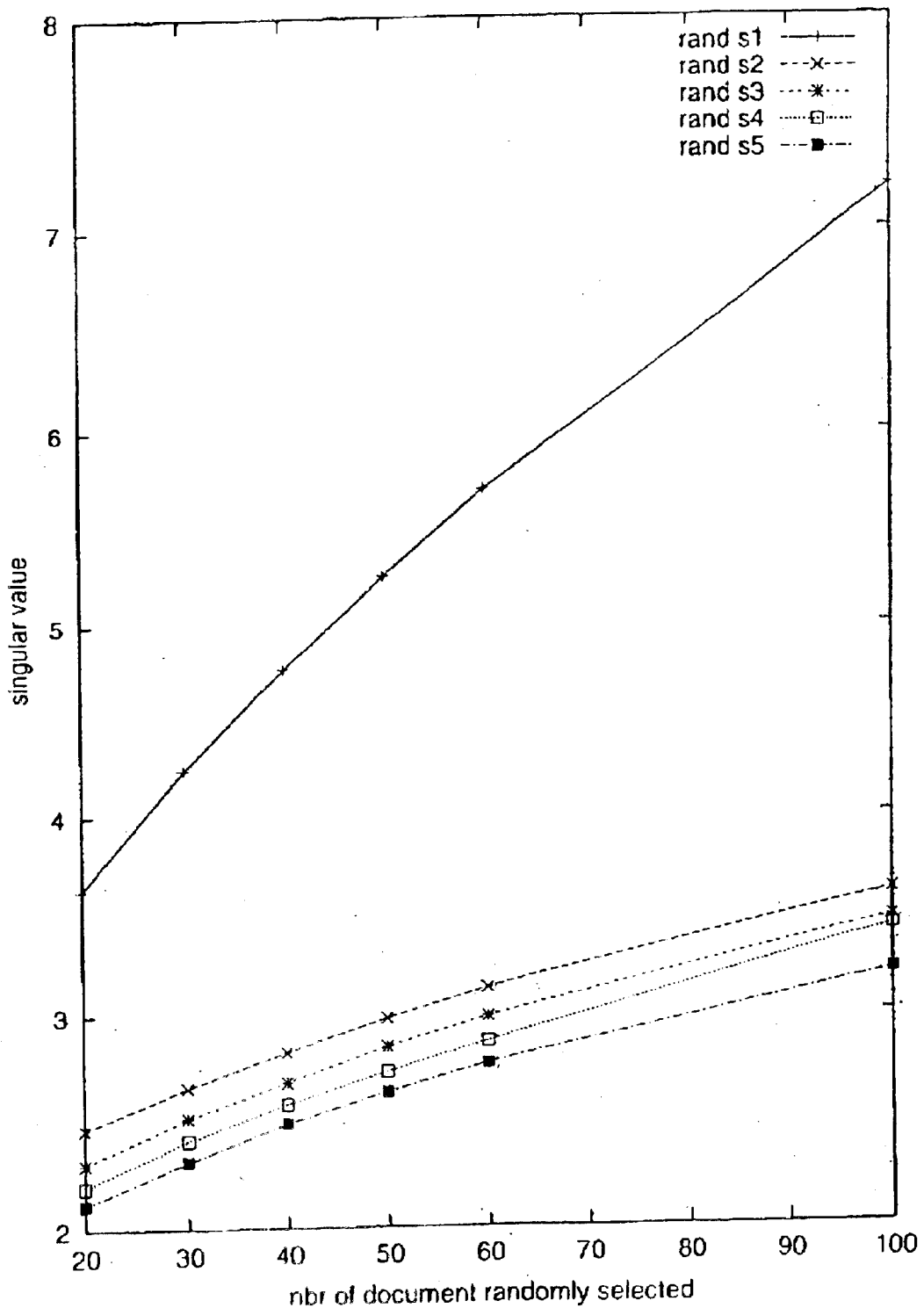
Figure 10:
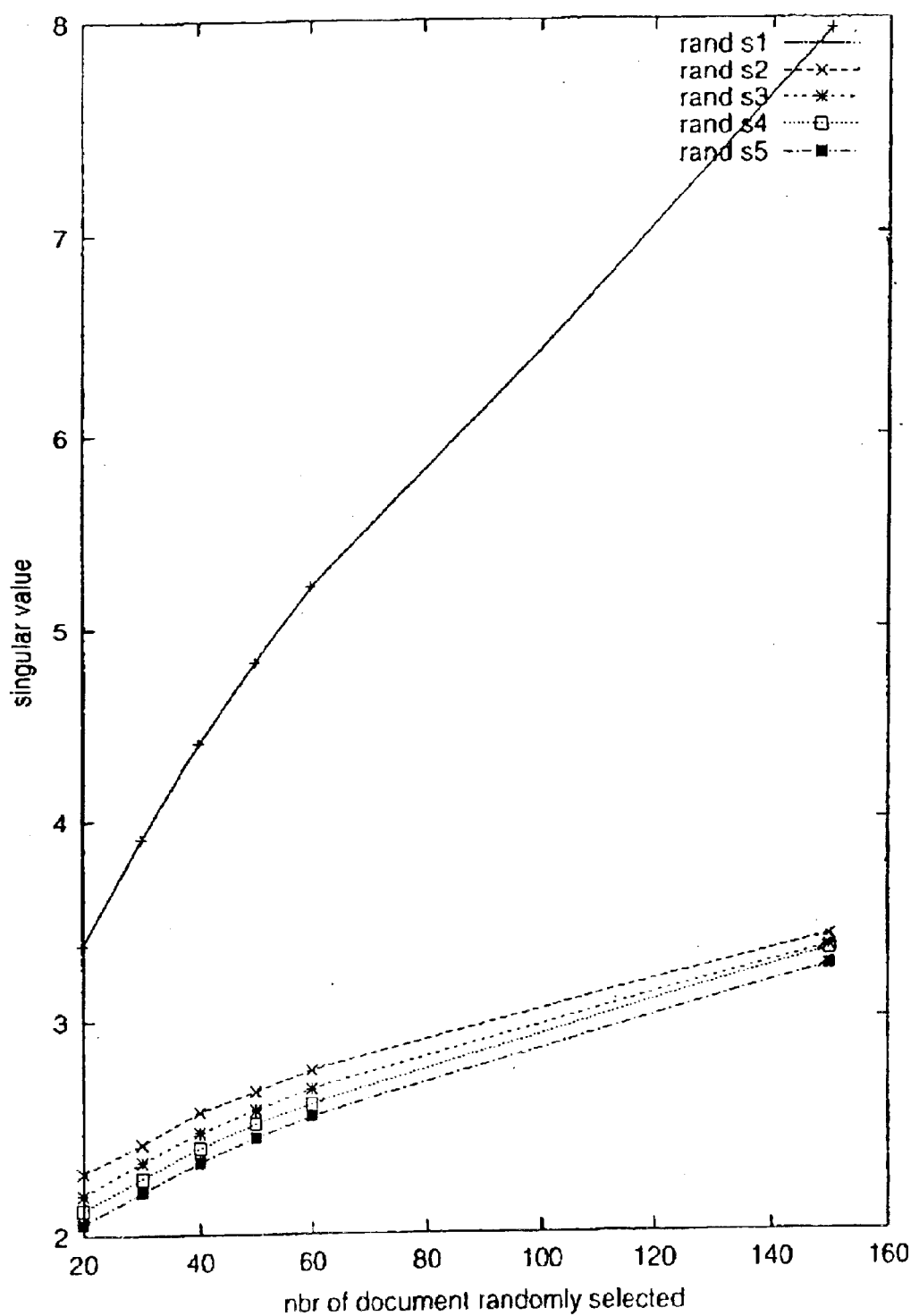
Figure 11:
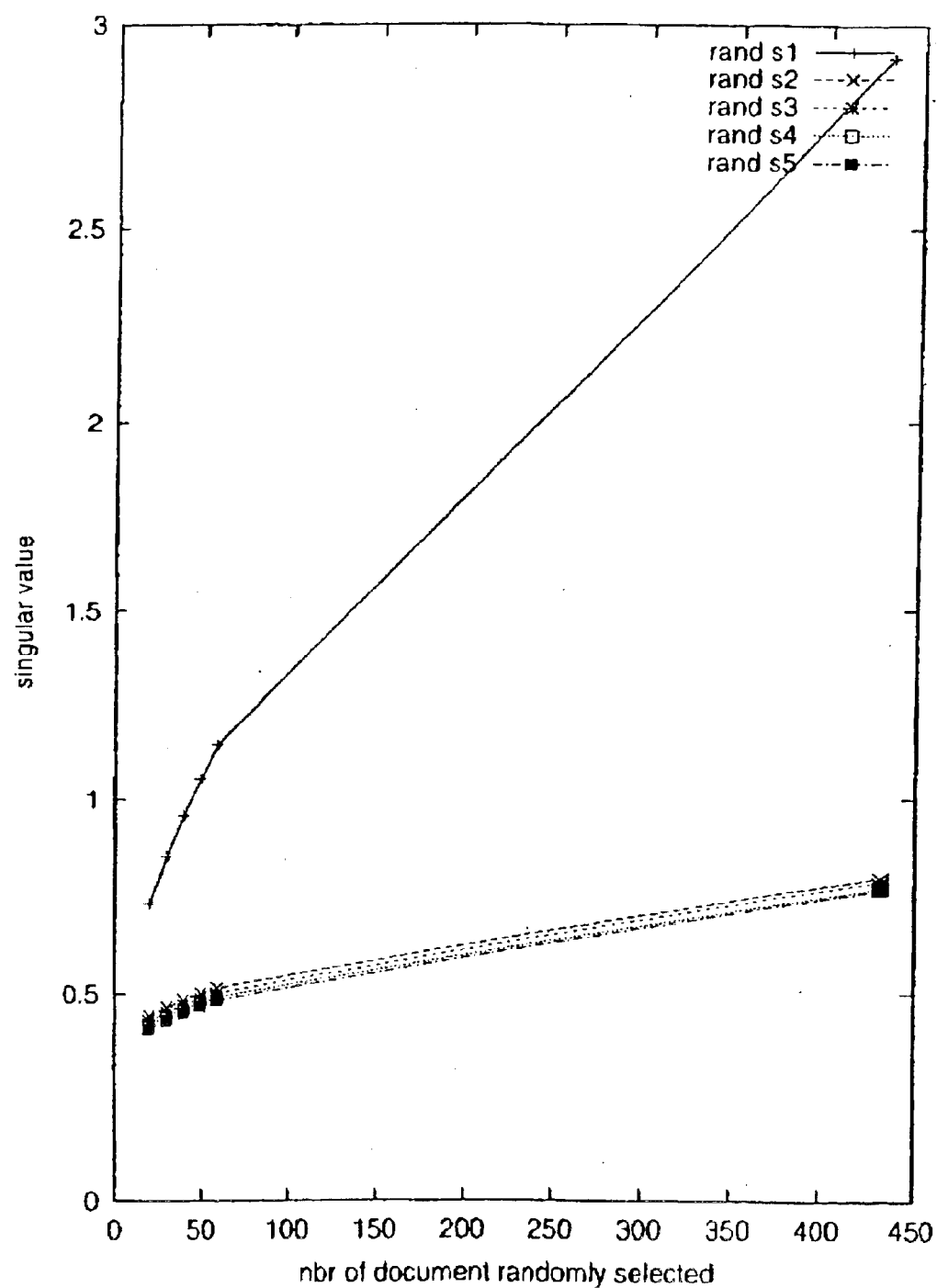
FIG. 11~FIG. 18 shows results from the computation for larger matrixes using the modified neural networks for curve fitting and extrapolation.
Figure 12:
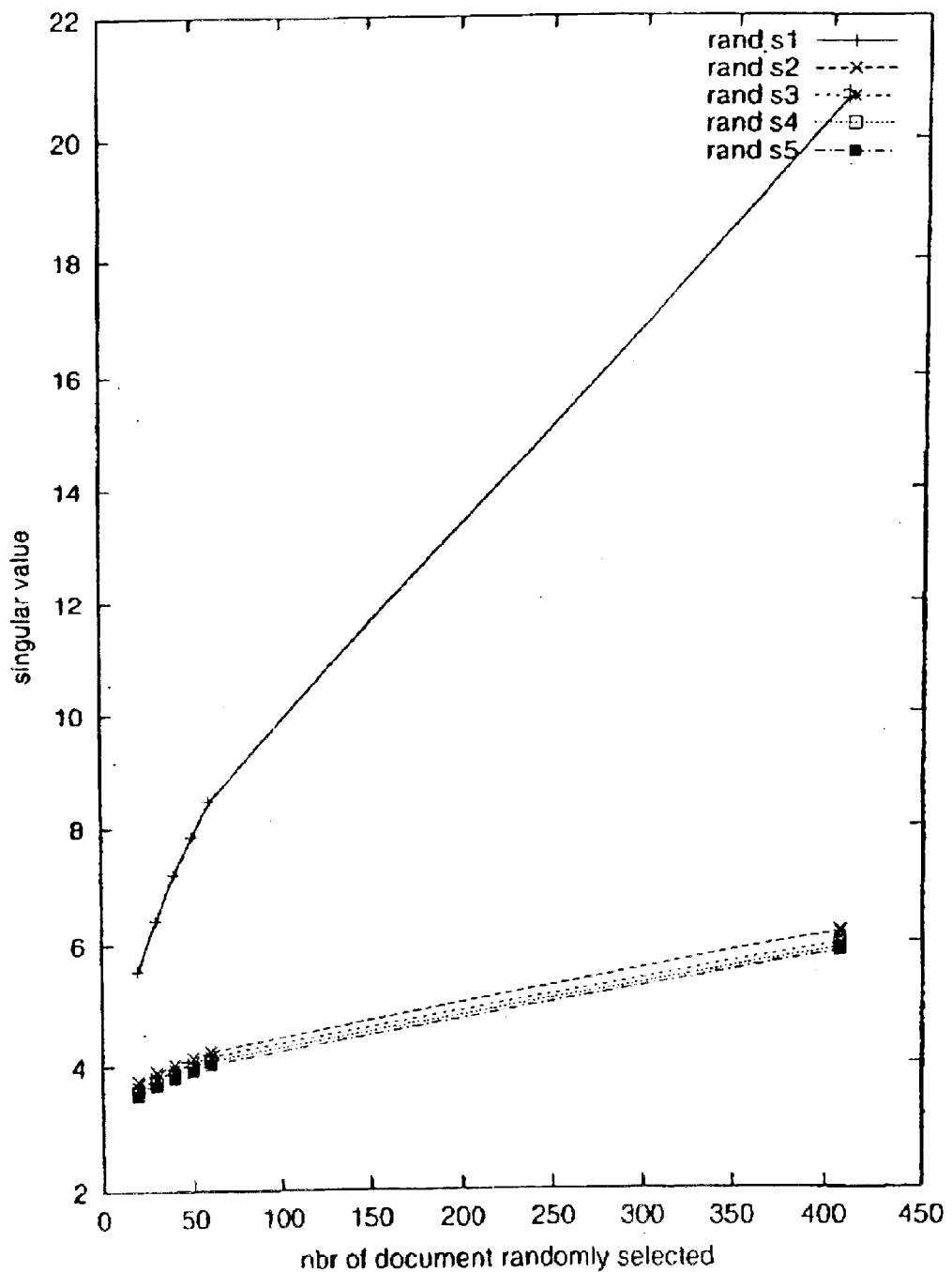
Figure 13:
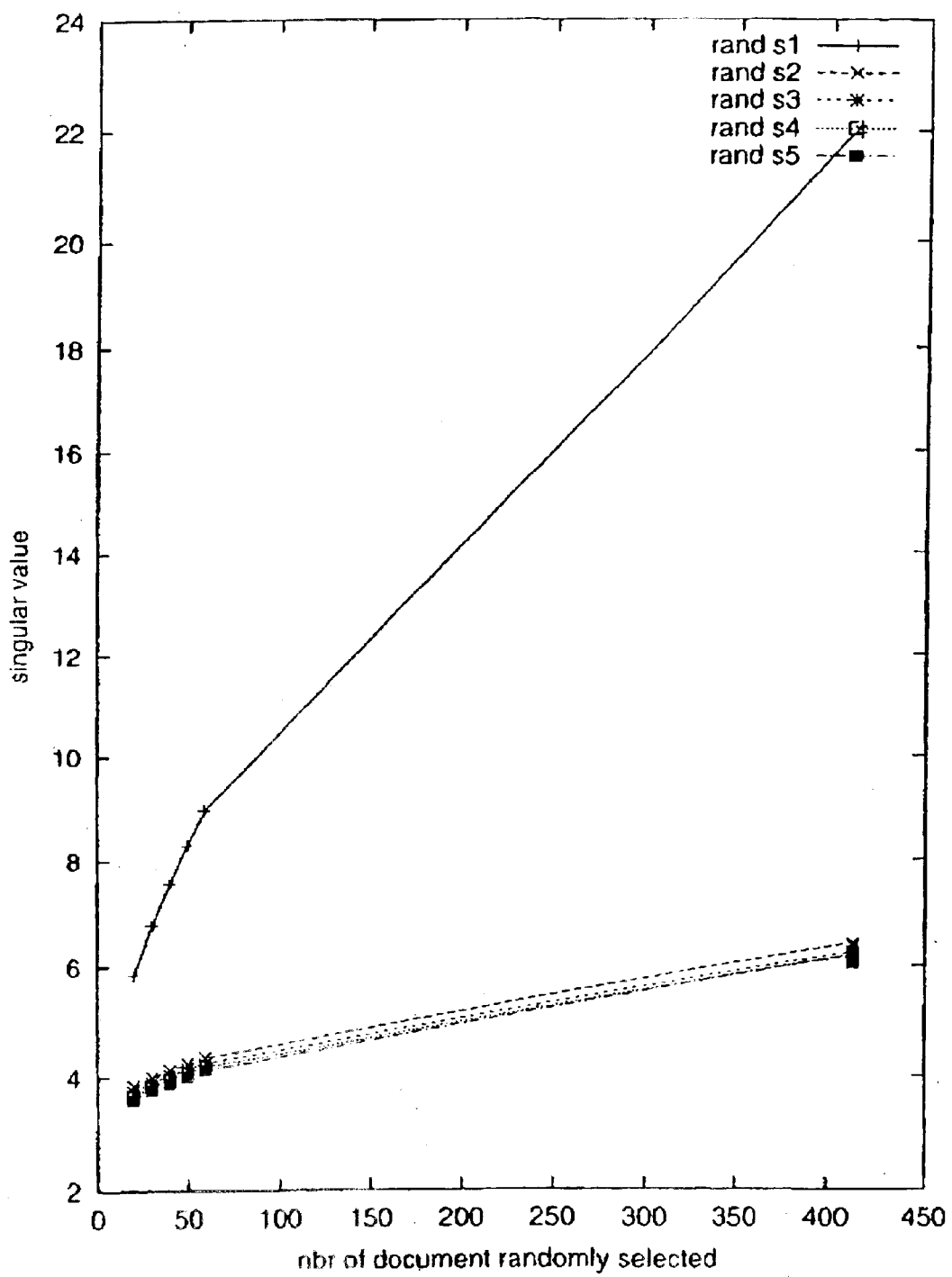
Figure 14:
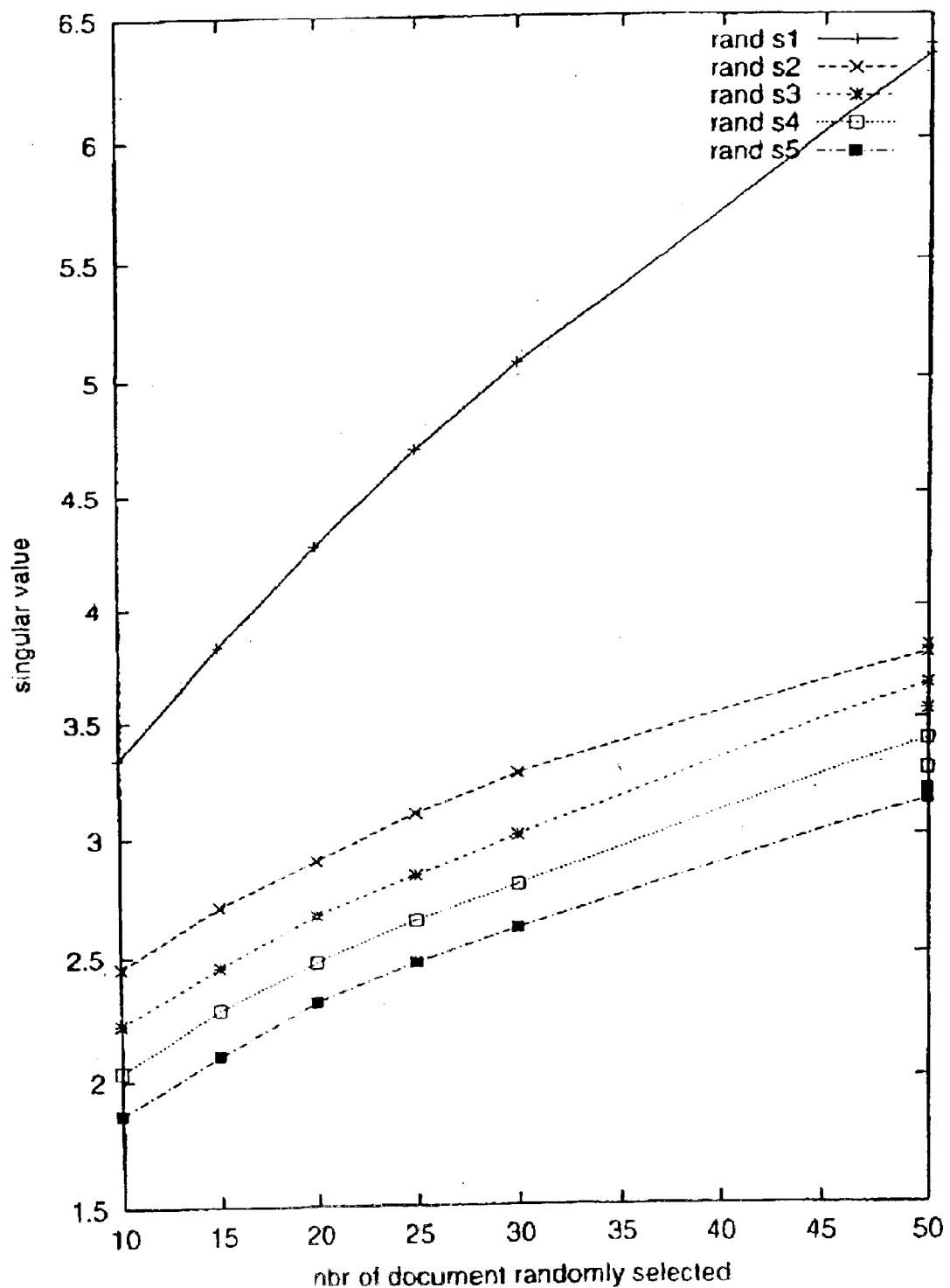
Figure 15:
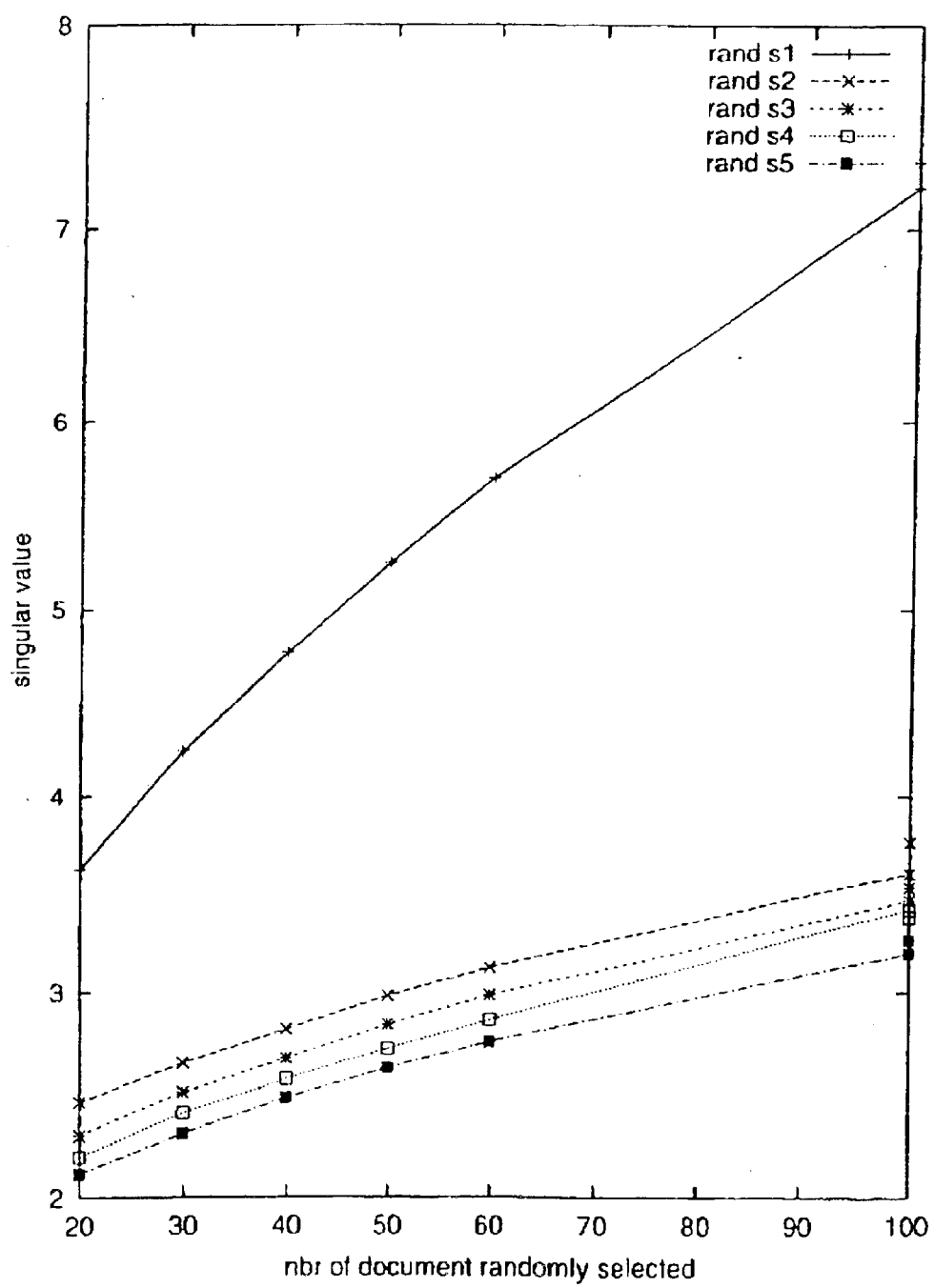
Figure 16:
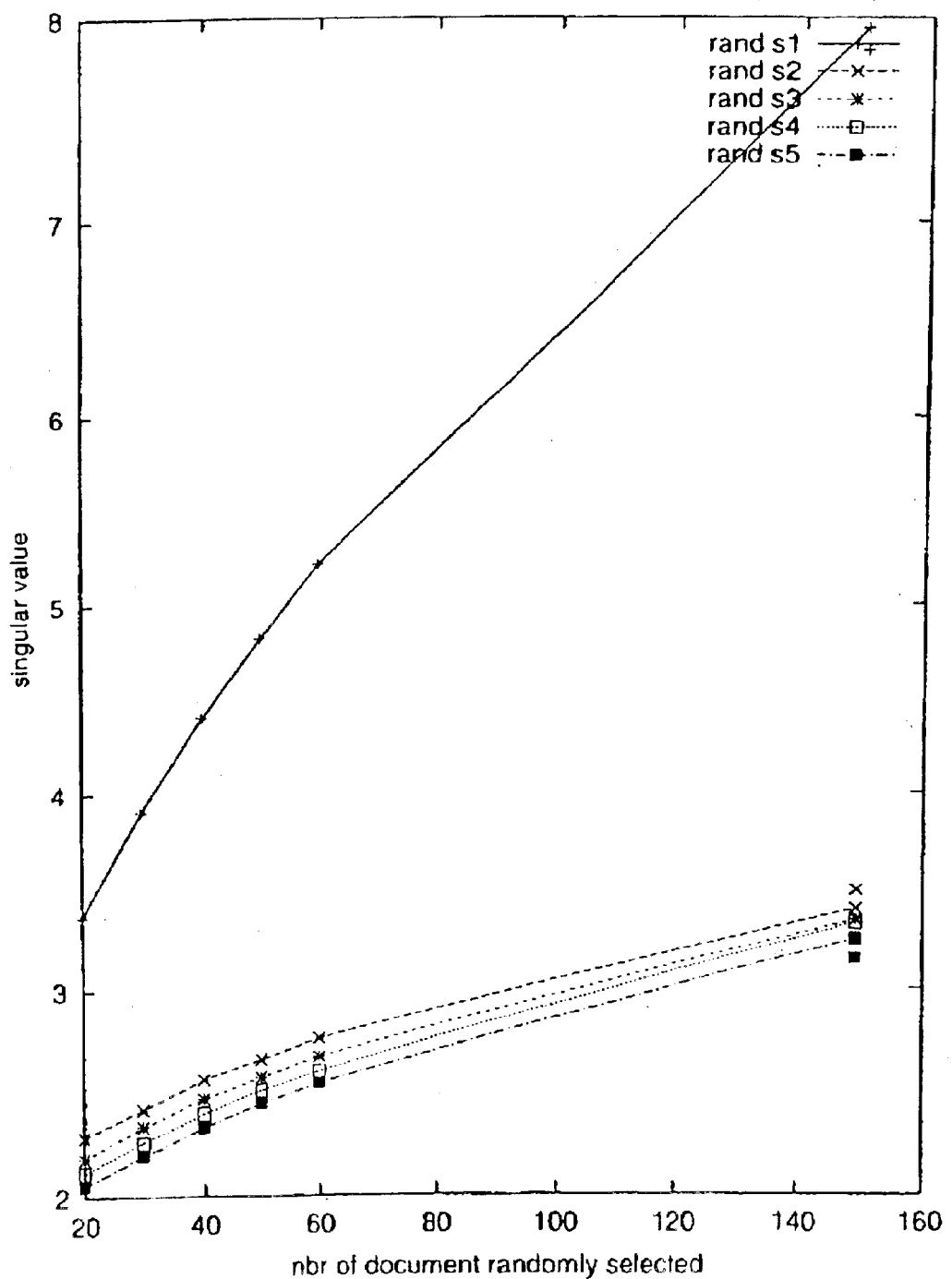
Figure 17:
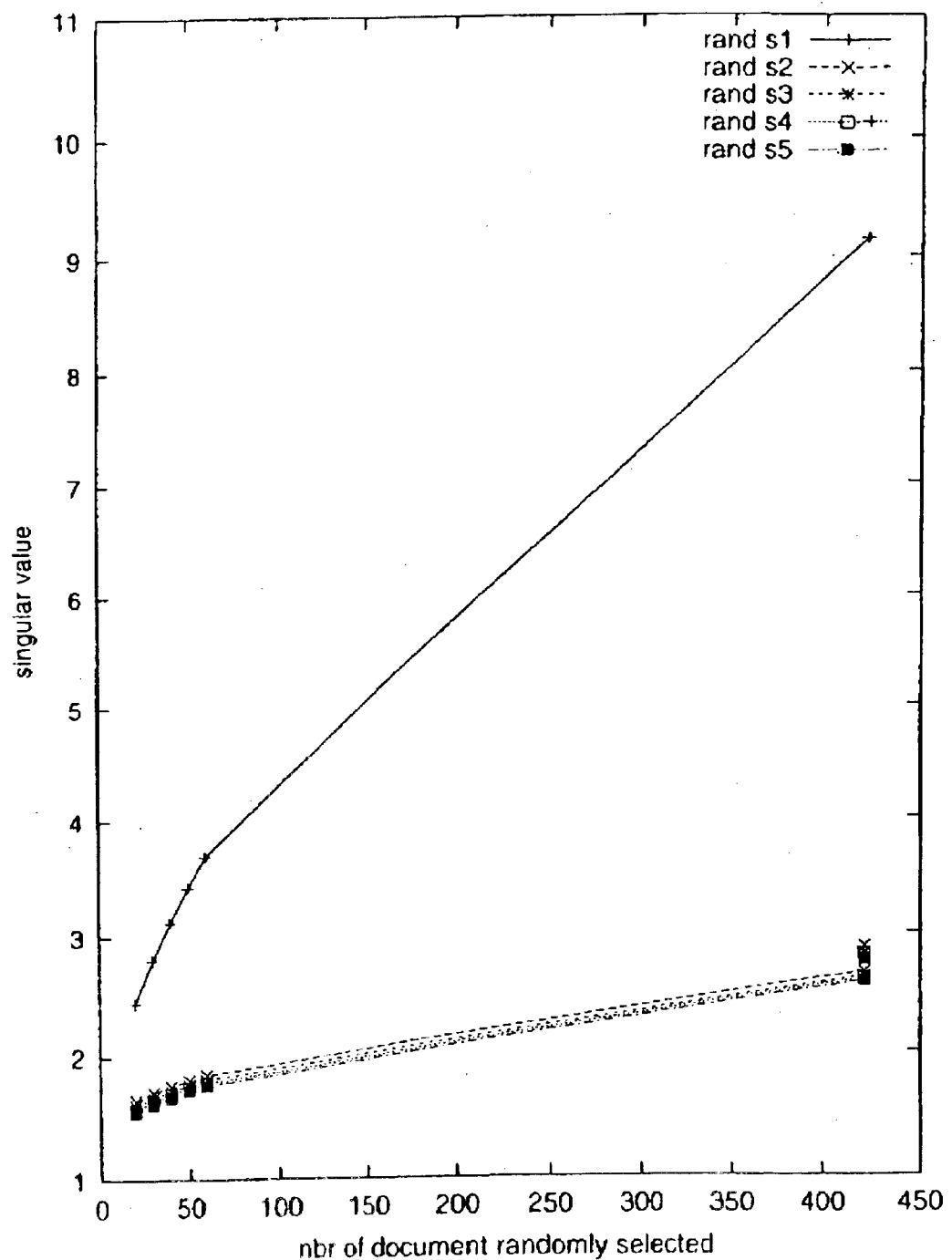
Figure 18:
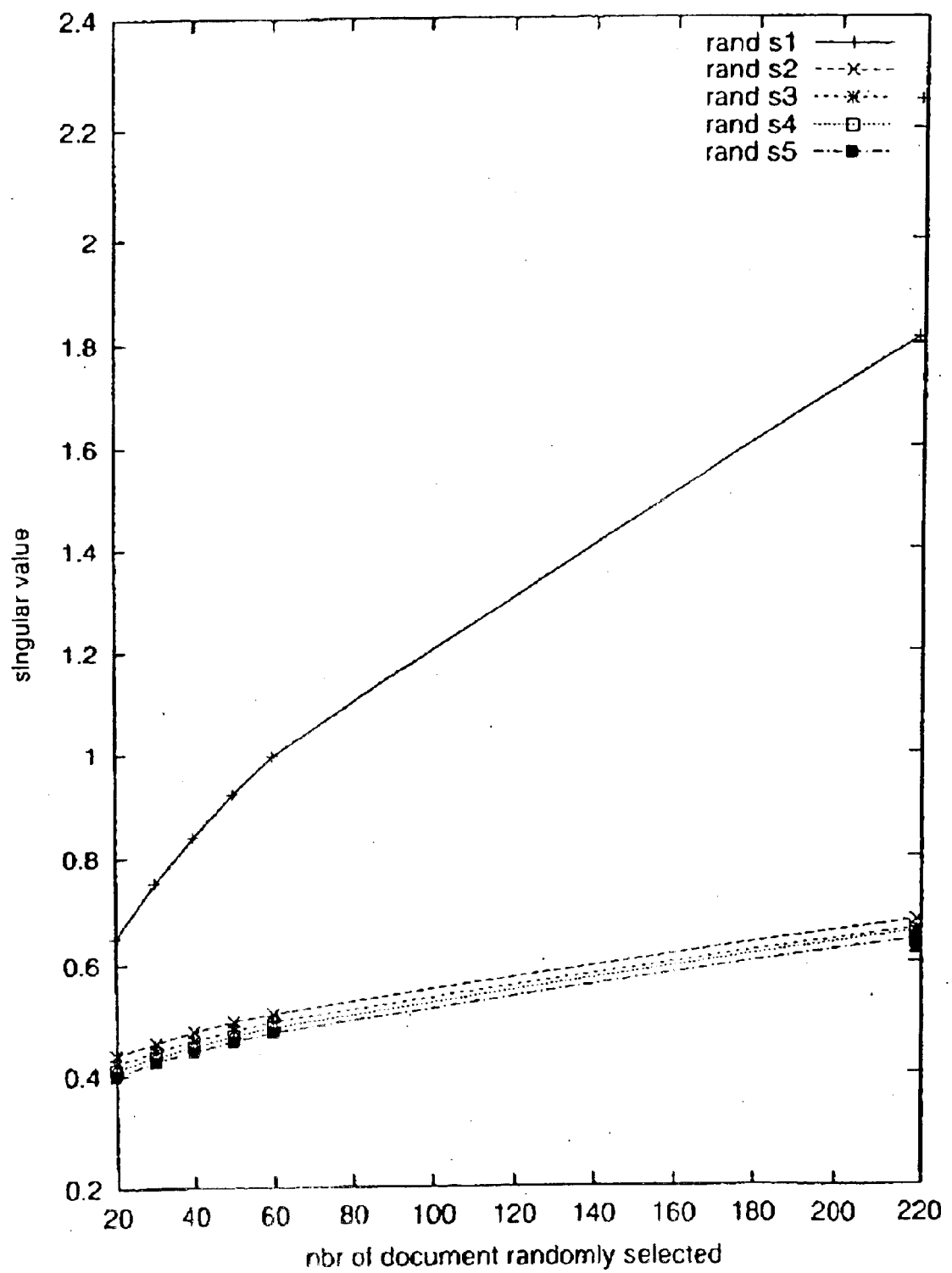

For examination of each matrix, the inventors took random samples of the rows of the matrix and computed the largest top 5 singular values. The random sampling process was repeated 100 times and computed the mean values of the singular values and the standard deviation thereof. Results from the experiments are shown in FIG. 8~FIG. 10 for the matrixes of 50-by-50, 100-by-100, and 150-by-150. In the results shown in FIG. 8~FIG. 10, a neural net algorithm which is a modified and enhanced version of a Multiple-layer Feedforward Network (MLFN) program was used (see, Masters, T., "Advanced Algorithms for Neural Networks: a C++ Sourcebook", John Wiley and Sons, NY, 1993). The modified algorithm and program description has been published (see Dupret, G., Spatiotemporal Analysis and Forecasting: Identical Units Artificial Neural Network, Ph.D. Thesis, University of Tsukuba, Dept. of Policy and Planning Science, March 2000). The computation is essentially based on the following steps;

(1) the Conjugate Gradient Method,
(2) Direct Line Minimization, and
(3) Stochastic Optimization (Simulated Annealing).

As shown in FIG. 8~FIG. 10, the extrapolations well match to the computed actual values.

Example 4

Results from the computation for other matrixes including larger elements using the modified neural networks for curve fitting and extrapolation are given in FIG. 11~FIG. 18. The sample matrixes to obtain the results for FIGS. 11~18 have 433×433 elements, 408×408 elements, 414×414 elements, 50×50 elements, 100×100 elements, 150×150 elements, 423×423 elements and 219×219 elements, respectively. The numerical data thereof are given in Table II. The numerical data showed that the error for the predicted values for the largest singular values match sufficiently within 1–2% at most and sometime within 1% even when only 10–20% of the rows was sampled to construct the smaller matrix, and basic neural net program is used to fit and extrapolate the curves.

The present invention has been explained in detail with respect to the document-keyword matrix, however, the present invention also applied to the computation of singular values and eigenvalues of matrixes in the various scientific and technical fields, such as, for example, mathematics, physics, construction, computer science, and information retrieval, etc.

As described hereinabove, the computer system and the program product according to the present invention may provide sufficiently accurate estimation for the singular values of very large matrixes, especially from the largest top singular value to the 5-th singular value and/or very large symmetric, positive definite matrixes when the matrixes are so large that use of standard algorithms are not effective.

In addition, the present invention has been described with respect to the specific embodiments thereof. The above examples are only provided for illustrative purposes and are not intended to limit the present invention. Therefore, a person skilled in the art may appreciate that various omissions, modifications, and other embodiments are possible within the scope of the present invention. Particularly, the procedures shown in FIG. 1, FIG. 2, FIG. 4 and FIG. 5 may be altered to provide equal advantages understood by a person in the art.

TABLE I

Experiment 1:

| ·0 docs sampled | estimated singular value | standard deviation | (100 *std dev)/ singular value |
|---|---|---|---|
| largest singular value | | | |
| 5000 | 161.54 | 1.48158 | 0.9172 |
| 10000 | 228.516 | 1.28316 | 0.5815 |
| 15000 | 279.56 | 1.35796 | 0.4857 |
| 20000 | 322.758 | 1.58681 | 0.4917 |
| 25000 | 360.77 | 1.47101 | 0.4077 |
| 30000 | 395.405 | 1.44595 | 0.3857 |
| 35000 | 428.768 | 1.34821 | 0.3159 |
| 36403 | 43514 | 0 | 0 <--- actual value |
| 40000 | 456.208 | 1.28124 | 0.2622 |
| second largest singular value | | | |
| 5000 | 84.1095 | 1.69861 | 2.0052 |
| 10000 | 119.331 | 1.50119 | 1.2580 |
| 15000 | 145.622 | 1.7857 | 1.2262 |
| 20000 | 168.081 | 1.58 | 0.9441 |
| 25000 | 181.996 | 1.65415 | 0.8798 |
| 30000 | 205175 | 1.72897 | 0.8402 |
| 35000 | 222.13 | 1.67498 | 0.7541 |
| 36403 | 230.74 | 0 | 0 <--- actual value |
| 40000 | 237.51 | 1.51121 | 0.6363 |
| third largest singular value | | | |
| 5000 | 79.1119 | 1.85419 | 2.3445 |
| 10000 | 111.99 | 1.6914 | 1.5103 |
| 15000 | 137.308 | 1.50624 | 1.0970 |
| 20000 | 157.945 | 1.1147 | 1.0856 |
| 25000 | 177.098 | 1.50329 | 0.8488 |
| 30000 | 193.911 | 1.16334 | 0.9094 |
| 35000 | 209.351 | 1.650030 | 0.7882 |
| 36403 | 209.897 | 0 | 0 <--- actual value |
| 40000 | 223.837 | 1.54668 | 0.8910 |
| fourth largest singular value | | | |
| 5000 | 66.5506 | 1.10516 | 1.8813 |
| 10000 | 93.5245 | 0.910262 | 0.9733 |
| 15000 | 114.257 | 0.871629 | 0.7861 |
| 20000 | 131.159 | 0.974438 | 0.7396 |
| 25000 | 147.268 | 0.834012 | 0.5663 |
| 30000 | 161.239 | 0.847171 | 0.5258 |
| 35000 | 174.042 | 0.828651 | 0.4761 |
| 36403 | 178.821 | 0 | 0 <--- actual value |
| 40000 | 186.166 | 0.831076 | 04464 |
| fifth largest singular value | | | |
| 5000 | 62.6745 | 2.18304 | 3.4831 |
| 10000 | 89.0226 | 2.29186 | 2.5741 |
| 15000 | 108.13 | 2.75832 | 2.5368 |
| 20000 | 125.121 | 2.45111 | 1.9501 |
| 25000 | 140.036 | 2.61187 | 1.8651 |
| 30000 | 153.438 | 2.66805 | 1.7388 |
| 35000 | 165.346 | 2.65614 | 1.6025 |
| 36403 | 175.753 | 0 | 0 <--- actual value |
| 40000 | 171.134 | 2.85345 | 1.6108 |

TABLE II

| % of rows sampled | <---------- singular values ----------> | | | | |
|---|---|---|---|---|---|
| | sv1 | sv2 | sv3 | sv4 | sv5 |
| matrix 0 | | | | | |
| 20 | 0.72723 | 0.44620 | 0.43252 | 0.42267 | 0.413197 |
| 30 | 0.84923 | 0.46738 | 0.45406 | 0.44405 | 0.43508 |
| 40 | 0.95157 | 0.48519 | 0.41215 | 0.46237 | 0.453525 |
| 50 | 1.05399 | 0.50141 | 0.48858 | 0.47823 | 0.470148 |
| 50 | 1.14191 | 0.51450 | 0.50179 | 0.49191 | 0.483833 |
| 433 rows | | | | | |
| exact | 2.91868 | 0.19140 | 0.78693 | 0.16865 | 0.763555 |
| predicted: matrix 1 | 2.91829 | 0.78334 | 0.78460 | 0.71399 | 0.713992 |
| 20 | 5.57267 | 3.75887 | 3.66296 | 3.59168 | 3.52545 |
| 30 | 6.41632 | 3.90178 | 3.80677 | 3.73418 | 3.67511 |
| 40 | 7.48334 | 4.02225 | 193523 | 3.86042 | 3.80941 |
| 50 | 7.84493 | 4.13141 | 4.04518 | 3.98116 | 3.94950 |
| 60 | 8.46411 | 4.2324 | 5 4.14917 | 4.08335 | 4.0231 |
| 408 rows | | | | | |
| exact | 20.5324 | 6.17368 | 5.97194 | 5.89014 | 5.83628 |
| predicted: matrix 2 | 20.1545 | 6.19614 | 6.07404 | 5.98334 | 5.89627 |
| 20 | 5.93888 | 3.84486 | 3.73691 | 3.55812 | 3.59012 |
| 30 | 6.75588 | 4.00356 | 3.90652 | 3.82938 | 3.76324 |
| 40 | 1.55936 | 4.13091 | 4.03432 | 3.96119 | 3.89693 |
| 50 | 8.29249 | 4.24866 | 4.15304 | 4.01951 | 4.01612 |
| 60 | 8.94493 | 4.35504 | 4.25137 | 4.18587 | 4.12149 |
| 414 rows | | | | | |
| exact | 22.085 | 6.41339 | 6.24598 | 6.19425 | 6.18721 |
| predicted: matrix 3 | 21.971 | 6.36723 | 6.2221 | 6.12456 | 6.03742 |
| 10 | 3.33885 | 2.45431 | 2.22538 | 2.03553 | 1.86694 |
| 15 | 3.83106 | 2.10173 | 2.45462 | 2.28319 | 2.0981 |
| 20 | 4.21383 | 2.90072 | 2.66843 | 2.47278 | 2.31086 |
| 25 | 4.89209 | 3.09658 | 2.83547 | 2.64588 | 2.46873 |
| 30 | 5.07048 | 3.26885 | 3.00324 | 2.79438 | 261056 |
| 50 rows | | | | | |
| exact: | 6.33911 | 178967 | 3.65209 | 3.40648 | 3.14792 |
| predicted: matrix 4 | 6.37887 | 3.8182 | 3.53673 | 3.27363 | 3.19311 |
| 20 | 3.6205 | 2.45983 | 2.29845 | 2.19441 | 2.11359 |
| 30 | 4.23928 | 2.64988 | 2.50786 | 2.40408 | 2.30662 |
| 40 | 4.76766 | 2.81614 | 2.67117 | 251005 | 2.4807 |
| 50 | 524972 | 2.98001 | 2.8382 | 2.71885 | 2.62267 |
| 60 | 5.69946 | 312268 | 299378 | 2.86098 | 2.75399 |
| 100 rows | | | | | |
| exact | 7.20429 | 3.59851 | 3.45912 | 341632 | 3.19492 |
| predicted: matrix 5 | 7.33406 | 3.76069 | 3.52718 | 3.37614 | 3.25913 |
| 20 | 3.36575 | 2.28341 | 2.18359 | 2.11564 | 2.05212 |
| 30 | 390589 | 2.41334 | 2.33068 | 2.25813 | 2.19526 |
| 40 | 4.4021 | 2.56226 | 248582 | 2.3937 | 2.3285 |
| 50 | 4.82649 | 2.65764 | 2.5705 | 2.50631 | 2.44106 |
| 60 | 5.21732 | 2.76016 | 2.87073 | 2.59850 | 2.54005 |
| 150 rows | | | | | |
| exact: | 7.95179 | 3.39929 | 3.34484 | 3.33042 | 3.25039 |
| predicted: matrix 6 | 7,34338 | 3.49566 | 3.34637 | 3.24582 | 3.15305 |
| 20 | 2.43857 | 1.64108 | 1.60204 | 1.56962 | 1.54235 |
| 30 | 2.80155 | 1.70704 | 1.68635 | 1.63386 | 1.60981 |
| 40 | 3.12149 | 1.15776 | 1.71584 | 1.68987 | 1.864 |
| 50 | 3.423 | 1.80245 | 1.76159 | 1.74046 | 1.11755 |
| 60 | 3.69002 | 1.84566 | 1.80633 | 1.11391 | 1.15536 |
| 423 rows | | | | | |
| exact | 9.14847 | 2.06539 | 2.62488 | 2.50519 | 2.58765 |
| predicted: matrix 7 | 10.1169 | 2.88049 | 2.82347 | 2.80857 | 2.77276 |
| 20 | 0.8480 | 10,43693 | 0.42041 | 0.40968 | 0.39953 |
| 30 | 0.75211 | 0.45921 | 0.44442 | 0.43413 | 0.425092 |
| 40 | 0.83913 | 0.47975 | 0.45300 | 0.45224 | 0.4434.82 |
| 50 | 0.92261 | 0.49718 | 0.48189 | 0.47116 | 0.461193 |
| 60 | 0.99830 | 0.51090 | 0.49684 | 0.48665 | 0.41147 |
| 219 rows | | | | | |
| exact | 1.8122 | 0.67792 | 0.66211 | 0.65693 | 0.642956 |
| predicted: | 2.25121 | 0.67873 | 0.55406 | 0.63838 | 0.624648 |

What is claimed is:

1. A program product including a computer readable computer program encoded in a storage medium, said computer program executing an algorithm for computing a characteristic value of a matrix comprising steps of:

providing a first matrix comprising M rows and N columns (M-by-N matrix); providing second matrixes by randomly selecting rows from said first matrix, each of said second matrixes including predetermined numbers of rows smaller than the numbers of rows of said first matrix; computing said characteristic values for each of said second matrixes;

plotting each of said characteristic values with respect to said predetermined numbers of rows; and extrapolating said plots to said number of rows of said first matrix so as to obtain a characteristic value of said first matrix.

2. The program product according to the claim 1, wherein said characteristic value is a singular value of said matrixes.

3. The program product according to the claim 1, wherein said characteristic value is an eigenvalue of said matrixes.

4. The program product according to the claim 1, wherein said step of computing said characteristic value comprises a step of computing i-th characteristic values, and said step of plotting comprises a step of plotting i-th characteristic values with respect to said predetermined numbers of rows so as to obtain i-th characteristic values of said first matrix.

5. The program product according to the claim 1, wherein said step of extrapolating said plots is carried out by curve fitting and an extrapolation by a neural net method.

6. The program product according to the claim 5, wherein said characteristic value is a singular value.

7. The program product according to the claim 5, wherein said characteristic value is an eigenvalue.

8. The program product according to the claim 1, wherein said second matrixes are formed as a series of matrixes comprising a predetermined relation of said numbers of rows.

9. The program product according to the claim 1, wherein said characteristic values of said each second matrix is computed and averaged for each of said series prior to said step of extrapolation.

* * * * *